UNITED STATES PATENT OFFICE.

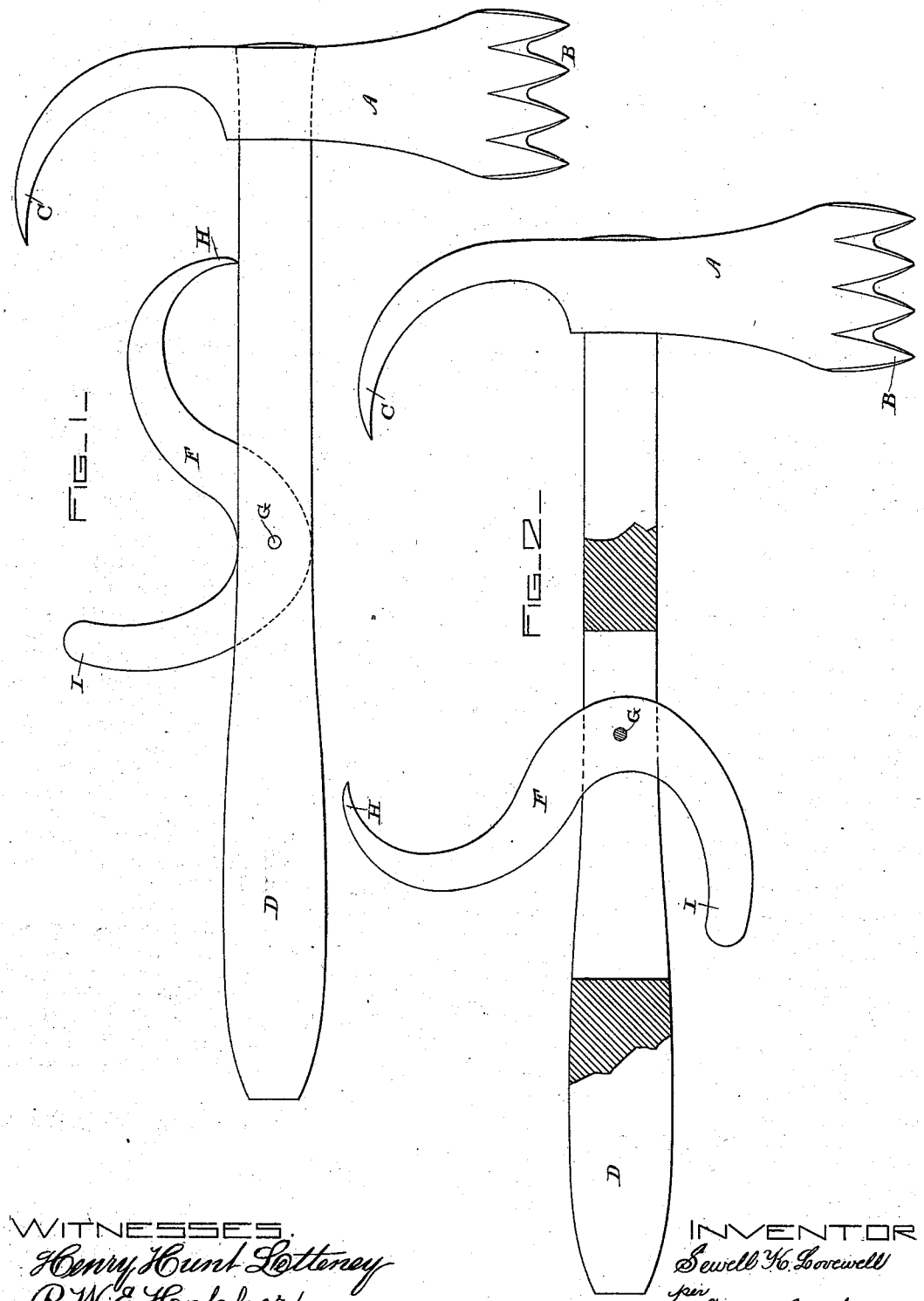

SEWELL K. LOVEWELL, OF CHELSEA, MASSACHUSETTS.

ICE-TOOL.

SPECIFICATION forming part of Letters Patent No. 402,173, dated April 30, 1889.

Application filed June 4, 1888. Serial No. 276,052. (No model.)

*To all whom it may concern:*

Be it known that I, SEWELL K. LOVEWELL, of Chelsea, in the county of Suffolk and State of Massachusetts, have invented a new and useful Improvement in Ice-Tools for Breaking and Handling Ice for Household Use, which will, in connection with the accompanying drawings, be hereinafter fully described, and specifically defined in the appended claim.

My invention relates to an implement or tool for handling and breaking ice for household use; and it consists in an ice-tool possessing the novel features hereinafter fully set forth and claimed.

In the accompanying drawings, Figure 1 is a side view of an ice-tool embodying my invention. Fig. 2 is a similar view, partly in section, and showing the slot in the handle in which the hooked lever is pivoted.

The implement consists of a hatchet, A, formed preferably with a serrated blade, B, and an opposite finger or pointed hook, C. Inserted in the eye of the hatchet, in the usual manner, is a handle, D, in which is a slot, E. In slot E is secured a hooked lever, F, pointed at one end, which is pivoted therein at G. The point H of lever F co-operates with point C of the hatchet in serving as a means by which a piece of ice may be lifted and carried, said movable point H being forced into a body of ice grasped between the same and the fixed point C by manipulating the curved end I of lever F. Grasping handle D and end I of the lever at the same time will securely seize a piece of ice interposed between points H and C and safely convey the same to its destination. When lever F is not thus in use, it may be turned in slot E into the idle or resting position shown in Fig. 1, and practically out of the way when the hatchet-blade only is to be used.

Ice may be split into large fragments by the use of the hatchet in the usual manner of striking and cutting with such a tool; may be shaved into finer pieces by employing the serrated blade as a cutter operated by pressure, after the manner of using a planing-tool, and may be handled and carried between points C and H, from place to place, in blocks of moderate size, without the necessity of subjecting the hands to that cold, disagreeable, and dangerous service, and constructed as shown and described constitutes a very convenient and useful household implement for the purposes stated.

I claim—

The ice-tool described, consisting of the handle, the head formed at one end as an ice cutting or separating implement and at the other as a curved hook or point, and the curved and pointed lever pivoted to the handle, so as to co-operate with the hook as a tongs, or be turned away therefrom, as specified.

SEWELL K. LOVEWELL.

Witnesses:
AMASA LOVEWELL,
OSCAR E. WHITMORE.